(12) United States Patent
Glenn et al.

(10) Patent No.: US 11,801,869 B2
(45) Date of Patent: Oct. 31, 2023

(54) SYSTEM AND METHOD FOR CONTROLLING AN AUTONOMOUS VEHICLE

(71) Applicant: Ford Global Technologies, LLC, Dearborn, MI (US)

(72) Inventors: Tyler Glenn, Ypsilanti, MI (US); Michael Hand, Ypsilanti, MI (US); Jash Patel, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 485 days.

(21) Appl. No.: 16/758,439

(22) PCT Filed: Oct. 24, 2017

(86) PCT No.: PCT/US2017/058035
§ 371 (c)(1),
(2) Date: Apr. 23, 2020

(87) PCT Pub. No.: WO2019/083505
PCT Pub. Date: May 2, 2019

(65) Prior Publication Data
US 2020/0255031 A1    Aug. 13, 2020

(51) Int. Cl.
*B60W 60/00* (2020.01)
*H04B 17/318* (2015.01)
(Continued)

(52) U.S. Cl.
CPC .. *B60W 60/0024* (2020.02); *B60W 60/00253* (2020.02); *G06Q 50/30* (2013.01);
(Continued)

(58) Field of Classification Search
CPC ....... B60W 60/0024; B60W 60/00253; B60W 2556/45; G06Q 50/30; G06Q 10/0631;
(Continued)

(56) References Cited

U.S. PATENT DOCUMENTS 9,368,026 B1   6/2016  Herbach et al.
9,451,020 B2   9/2016  Liu et al.
(Continued)

FOREIGN PATENT DOCUMENTS

GB         2544815 A    5/2017

OTHER PUBLICATIONS

International Search Report of the International Searching Authority for PCT/US2017/058035 dated Jan. 5, 2018.

*Primary Examiner* — James J Lee
*Assistant Examiner* — Alexander George Matta
(74) *Attorney, Agent, or Firm* — Vichit Chea; Brooks Kushman P.C.

(57) ABSTRACT

A method for controlling an autonomous vehicle is provided. While the vehicle is at a commanded destination the method may be responsive to an absence of an ingress/egress of a passenger for a predetermined period. The predetermined period may depend on whether the vehicle is in arrival mode or departure mode. The method may include commanding the vehicle to travel to a predetermined location selected to have measures of cellular-wireless signal strength that are greater than a predetermined threshold.

17 Claims, 2 Drawing Sheets

(51) Int. Cl.
*H04W 4/40* (2018.01)
*G06Q 50/30* (2012.01)
*H04W 4/021* (2018.01)

(52) U.S. Cl.
CPC .......... *H04B 17/318* (2015.01); *H04W 4/021* (2013.01); *H04W 4/40* (2018.02)

(58) Field of Classification Search
CPC ..... G06Q 10/02; H04B 17/318; H04W 4/021; H04W 4/40
See application file for complete search history.

(56) References Cited

U.S. PATENT DOCUMENTS

| | | |
|---|---|---|
| 9,465,388 B1 | 10/2016 | Fairfield et al. |
| 2014/0067257 A1* | 3/2014 | Dave ...................... H04W 4/40 701/423 |
| 2015/0338852 A1 | 11/2015 | Ramanujam |
| 2015/0339928 A1 | 11/2015 | Ramanujam |
| 2015/0346727 A1* | 12/2015 | Ramanujam ......... G05D 1/0088 701/23 |
| 2017/0123421 A1 | 5/2017 | Kentley et al. |
| 2017/0213164 A1* | 7/2017 | Rainbolt ................ G06Q 10/02 |
| 2019/0137290 A1* | 5/2019 | Levy ................... G05D 1/0276 |
| 2019/0155308 A1* | 5/2019 | Altinger ................ G06Q 50/30 |
| 2019/0228646 A1* | 7/2019 | Bermudez ............ G08G 1/0125 |

* cited by examiner

SYSTEM AND METHOD FOR CONTROLLING AN AUTONOMOUS VEHICLE

TECHNICAL FIELD

Aspects of this disclosure relate to vehicle hailing systems and methods including a vehicle having a controller that may command the vehicle to travel or linger based on the circumstances of the vehicle.

BACKGROUND

Ride sharing and carpooling are becoming more popular as technology enables operators and riders to more easily communicate availability and pricing for transportation. Taxi cab drivers and ride-sharing drivers generally know the appropriate location to wait or linger as well as the appropriate duration of waiting. For example, a vehicle picking up a passenger may wait longer for the passenger to enter the vehicle than a vehicle that is dropping off a passenger.

SUMMARY

According to one aspect of this disclosure a method for controlling an autonomous vehicle is provided. While the vehicle is at a commanded destination the method may be responsive to an absence of an ingress/egress of a passenger for a predetermined period. The predetermined period may depend on whether the vehicle is in arrival mode or departure mode. The method may include commanding the vehicle to travel to a predetermined location selected to have measures of cellular-wireless signal strength that is greater than a predetermined threshold and autonomously operate the vehicle to travel to the predetermined location.

According to another aspect of this disclosure an autonomous vehicle is provided. The vehicle may include a processor that may be programmed to command the vehicle to travel to a predetermined location selected to have measures of wireless signal strength greater than a predetermined threshold and responsive to expiration of a predetermined period, that depends on whether the vehicle is in arrival mode or departure mode, without passenger ingress/egress at a commanded destination and operate the vehicle to the predetermined location.

According to yet another aspect of this disclosure, a method for controlling an autonomous vehicle is provided. While the vehicle is at a commanded destination the method may be responsive to absence of a subsequent command to travel to a predetermined location selected to have measures of wireless signal strength greater than a predetermined threshold. The method may also include autonomously operating the vehicle to travel to the predetermined location.

DETAILED DESCRIPTION

Figure 1:
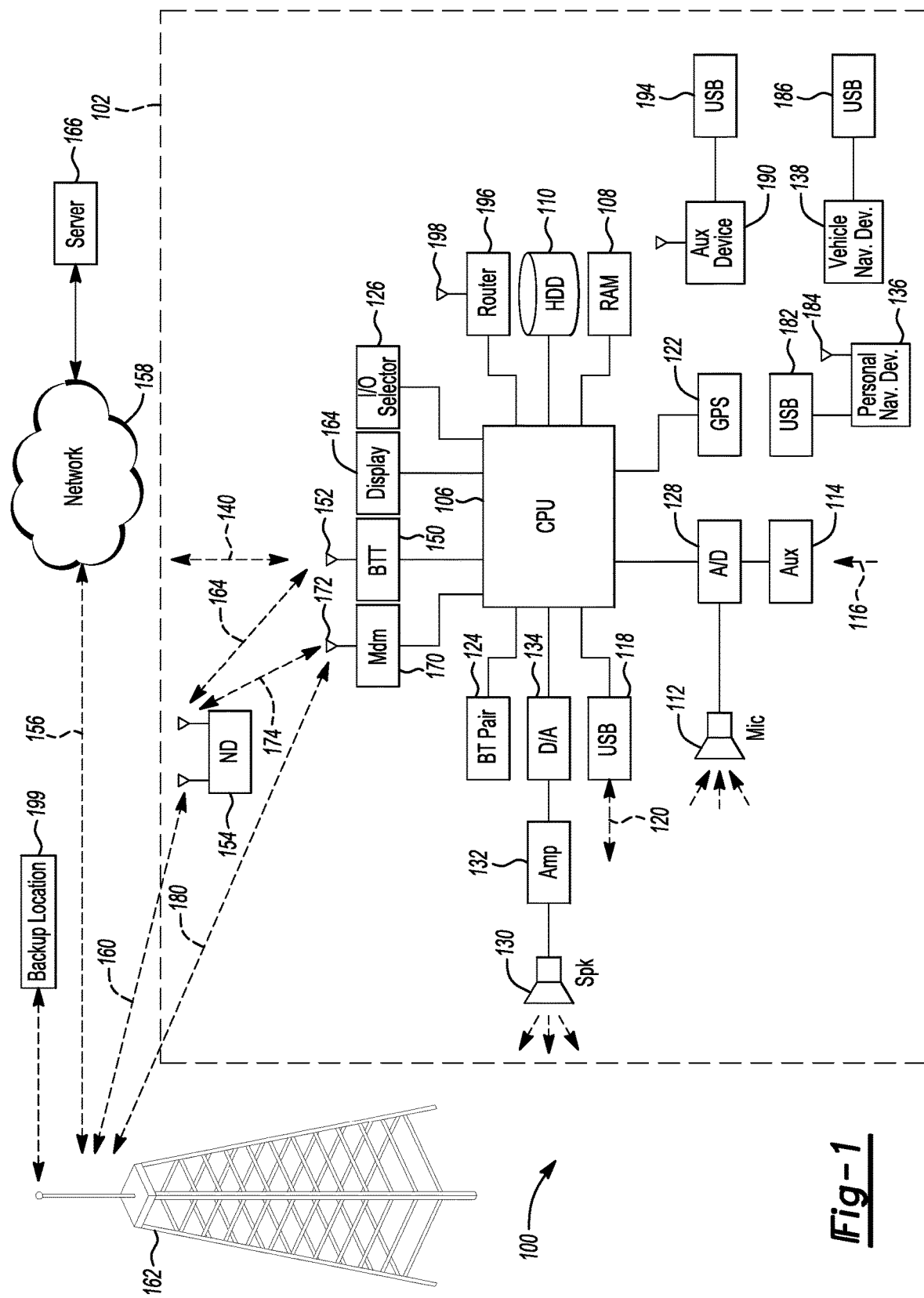
FIG. 1 is a block diagram illustrating a ride-hailing system having a vehicle computing system and telematic system configured to command the vehicle to linger for a predetermined duration and travel to a predetermined location selected to have measures of wireless signal strength greater than a predetermined threshold.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Circumstances surrounding an autonomous ride-hailing or ride-sharing vehicle or a fleet of autonomous ride-hailing or ride-sharing vehicles may require the vehicle to wait or linger at a commanded destination for different amounts of time (periods). For example, if the vehicle is arriving at a commanded destination, in arrival mode, to pick up a passenger, the vehicle may wait or linger for a longer period than a vehicle arriving at a commanded destination, in departure mode, to drop off a passenger. A passenger dropped off at the commanded destination, e.g., her home, may find a vehicle lingering outside of her home for an appreciable amount of time an annoyance. On the other hand, a vehicle arriving to pick up a passenger may wait or linger for a longer period of time to allow the future passenger to enter the vehicle. Upon termination of the period or linger time, the vehicle may be commanded to travel to a predetermined location or backup location. The predetermined location may be selected to have measures of wireless or cellular-wireless signal strength sufficient for the vehicle to receive its next command.

In one instance, the linger time or predetermined period may be terminated in response to the ingress (entrance) or egress (exit) of the passenger. The period may also be terminated in response to absence of receiving any further instructions while the vehicle is at the commanded destination. The vehicle may not receive further instructions for a variety of reasons. As one example, the vehicle may lose wireless signal due to location of the vehicle or deficient signal strength.

The vehicle is equipped with a processor that may be programmed to command the vehicle to travel to a commanded location specified by a dispatch or received from a future passenger that has summoned the vehicle (arrival mode). Alternatively, the commanded destination or location may be specified by the passenger's intended location he or she wishes to reach after summoning the vehicle (departure mode). The processor may be further programmed to command the vehicle to a backup location if the passenger has not entered or exited the vehicle for a predetermined period. In the absence of the passenger exiting the vehicle (egress) or absence of the future passenger entering the vehicle (ingress) the linger time or predetermined period may be terminated.

The processor may be programmed with the backup location or predetermined location or the processor may receive the predetermined location from a dispatcher or owner associated with the vehicle. Additionally, the predetermined location may be selected based on measures of future ride demand. Meaning, if the vehicle has received a signal indicating a concentration of possible passengers is higher in a location where lingering is permissible and the location has sufficient measures of wireless signal, the processor may select that location as its backup or predetermined location. To reach the predetermined location, the vehicle may travel a pre-programmed route or receive turn-by-turn directions to reach the predetermined location.

Similarly, the predetermined period or linger time may be pre-programmed for the commanded destination of the vehicle. For example, if the commanded destination is an airport, bus station, or another location where lingering or awaiting vehicles are common, the linger time or predetermined period may be longer than a linger time at a busy city intersection.

As another example, the method of controlling the vehicle to travel to the predetermined location selected to have sufficient measures of wireless strength, may be triggered after the vehicle has not received a subsequent demand for a predetermined linger time or period. The predetermined location and associated linger time or period may be specified by a dispatch associated with the vehicle before the vehicle leaves its starting or home location. As mentioned above, the linger time or period may depend on how permissible lingering or loitering is at the commanded destination of the vehicle. For example, if the dispatcher of the vehicle is familiar with the circumstances of the commanded destination, e.g., presence of local law enforcement, likelihood of receiving a parking citation, likelihood of disrupting traffic, etc., the dispatcher may increase or decrease the linger time or period.

FIG. 1 illustrates an example block topology for a vehicle-based computing system 100 (VCS) for a vehicle 102 of a vehicle sharing system according to a representative embodiment. An example of such a vehicle-based computing system 100 is the SYNC system manufactured by THE FORD MOTOR COMPANY. A vehicle enabled with a vehicle-based computing system may contain a visual front end interface 104 located in the vehicle. One or more users may be able to interact with interface 104, for example, using a touch sensitive screen. In another illustrative embodiment, the interaction occurs through button presses or spoken dialog processed by automatic speech recognition and speech synthesis systems, or through a connected personal device.

In the illustrative embodiment shown in FIG. 1, a processor 106 controls at least some portion of the operation of the vehicle-based computing system. Provided within the vehicle, the processor allows onboard processing of commands and routines. As described in greater detail below with reference to FIG. 2, processor 106 may perform various algorithms or functions associated with detecting position of a future passenger within a particular geographic area, or position of a predetermined location or backup location within a particular geographic area, and controlling the travel of the vehicle based on whether the vehicle is in arrival mode to pick up a passenger or departure mode to drop off a passenger. Further, the processor is connected to various types of non-transitory or tangible computer program products or storage media implementing both temporary or non-persistent storage 108 and persistent storage 110. In this illustrative embodiment, the non-persistent or temporary storage is implemented by random access memory (RAM) and the persistent storage is implemented by a non-transitory computer program product or medium such as a hard disk drive (HDD), flash drive, or flash memory. In general, persistent memory or storage can include all forms of memory or storage that maintain data when a computer or other device is powered down. This includes, but is not limited to, HDDs, CDs, DVDs, magnetic tapes, solid state drives, portable USB drives and any other suitable form of persistent memory.

The processor is also provided with a number of different inputs and outputs to facilitate user interaction with the processor and related devices. In this illustrative embodiment, a microphone 112, an auxiliary input 114 (for input 116), a USB interface 118 (for input/output 120), a GPS input 122, display screen 104, which may be a touchscreen display, and a BLUETOOTH pairing interface 124 are all provided. An input/output (I/O) selector 126 may be provided to facilitate user selection of a particular input/output for use. Input to both microphone 112 and auxiliary interface 114 may be converted from analog to digital signals by an associated A/D converter 128 before being communicated to the processor 106. Although not explicitly illustrated, vehicle components and auxiliary components in communication with the VCS may use a wired or wireless vehicle network (including, but not limited to, a CAN bus) to communicate signals representing data to and from the VCS (or components thereof). The VCS may also be connected to displays or HMI's associated with the passenger's or passengers' destination or departure location. Alternatively, or in combination, a passenger's or passengers' destination or departure location may be controlled by a passenger in the vehicle using a personal nomadic device or mounted HMI after boarding.

System outputs may include, but are not limited to, a visual display 104 and speakers 130 or other stereo system output. In various embodiments, a visual display 104 may be used to display passenger identification (name) and route information for boarding passengers. Speakers 130 are connected to an amplifier 132 and receive signals from processor 106 through a digital-to-analog converter 134. Input and output signals may also be communicated via a remote BLUETOOTH device such as a personal navigation device (PND) 136, or a USB device, such as vehicle navigation device 138, along the bi-directional data streams generally represented at 140 and 120.

In one illustrative embodiment, system 100 uses a BLUETOOTH transceiver 150 to wirelessly communicate 152 with one or more personal mobile or nomadic devices 154 (e.g., cell phone, smart phone, PDA, smart watch or any other device having wireless remote network connectivity). Nomadic device 154 can then be used to communicate 156 with a network 158 outside vehicle 102 through, for example, communication 160 with a satellite or cellular tower 162. In some embodiments, cellular tower 162 or a similar tower or antenna may function as a Wi-Fi access point. Likewise, vehicle 100 may communicate with a remote cloud server 166 over network 158 to exchange information with respect to the geographic coordinates and measures of wireless signal strength of the predetermined location or back up location 199. Moreover, the remote cloud server 166 may convey passenger identification information, passenger route information (including pick-up and drop-off locations), for example.

Nomadic device 154 may also be paired to vehicle 102 and communicate via BLUETOOTH or similar technology as represented by signal 164. Pairing of nomadic device 154 and BLUETOOTH transceiver 150 may be initiated by an associated button or interface 124, or similar input. Accordingly, CPU 106 pairs an onboard BLUETOOTH transceiver 152 with a BLUETOOTH transceiver in nomadic device 154.

Data may be communicated between CPU 106 and network 158 utilizing, for example, a data plan, data over voice, or DTMF tones associated with nomadic device 154. Alternatively, it may be desirable to include an onboard modem 170 having antenna 172 for communication 174 of data between CPU 106 and network 158 over the voice band. Nomadic device 154 may then be used for communication 156 with network 158 outside vehicle 102 through, for example, communication 160 with cellular tower 162. In some embodiments, modem 172 may establish communication 180 with tower 162 to communicate with network 158. As one example, modem 172 may be a USB cellular modem and communication 180 may be cellular communication.

In one illustrative embodiment, processor 106 is provided with an operating system including an API to communicate with modem application software. The modem application software may access an embedded module or firmware of BLUETOOTH transceiver 152 to complete wireless communication with a remote BLUETOOTH transceiver, such as that found in nomadic device 154, for example. BLUETOOTH is a subset of IEEE 802 PAN (personal area network) protocols. IEEE 802 LAN (local area network) protocols include Wi-Fi and have considerable cross functionality with IEEE 802 PAN protocols. Both are suitable for wireless communication within a vehicle. Other communication technology may also be suitable for wired or wireless communications within the vehicle, such as free-space optical communication (IrDA, for example), non-standardized consumer infrared (IR) protocols, and the like.

In another embodiment, nomadic device 154 includes a modem for voice band or broadband data communication. In the data-over-voice embodiment, frequency division multiplexing may be implemented allowing the owner of the nomadic device to talk over the device while data is being transferred. At other times, when the owner is not using the device, the data transfer can use the entire available bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), and Space-Domain Multiple Access (SDMA) for digital cellular communication. These are all ITU IMT-2000 (3G) compliant standards and offer data rates up to 2 Mbps for stationary or walking users and 385 kbps for users in a moving vehicle. 3G standards are now being replaced by IMT-Advanced (4G) which offers 100 Mbps for users in a vehicle and 1 Gbps for stationary users. In another embodiment, nomadic device 154 is replaced with a cellular communication device (not shown) that is installed in vehicle 102. In other embodiments, nomadic device 154 may be implemented by a wireless local area network (LAN) device capable of communication over, for example (and without limitation), an 802.11g network (i.e., Wi-Fi) or a WIMAX network, for example.

In one embodiment, incoming data can be passed through nomadic device 154 through onboard BLUETOOTH transceiver 150 to processor 106. In the case of certain temporary data, for example, the data can be stored on HDD 110 or mobile device or other storage media until such time as the data is no longer needed. Temporary data may include various sensor data collected for a particular user, trip, route, etc., that may be communicated to one or more cloud-based services for use in determining backup or predetermined locations with sufficient measures or wireless strength, current traffic conditions at one or more commanded destinations, predetermined periods or linger times, frequently traveled routes, destinations, pick-up locations, etc., associated with a particular ride-sharing passenger. The temporary data may then be deleted or overwritten after communication to other computers within the network.

As previously described, various devices may interface with VCS 100, such as personal navigation device 136, having a USB connection 182 and/or an antenna 184, vehicle navigation device 138 having a USB connection 186 or other connection, onboard GPS device 122, or remote navigation system (not shown) having connectivity to network 158. As used herein, USB generally represents any of a variety of serial networking protocols that may include IEEE 1394 protocols referred to as FIREWIRE™ (Apple), i.LINK™ (Sony), and LYNX™ (Texas Instruments), EIA (Electronics Industry Association) serial protocols, IEEE 1284 (Centronics Port), S/PDIF (Sony/Philips Digital Interconnect Format) and USB-IF (USB Implementers Forum), which form the backbone of the device-device serial standards. Most of the protocols can be implemented for either electrical or optical communication.

As also shown in FIG. 1, processor 106 may communicate with various other types of auxiliary devices 190. These devices may be connected through a wireless connection/antenna 192 and/or a wired connection 194. Auxiliary devices 190 may include, but are not limited to, personal media players, wireless health devices, portable computers, and the like. Processor 106 may also be connected to a vehicle based wireless router 196, using for example a Wi-Fi (IEEE 803.11) transceiver 198. This could allow processor 106 to connect to remote networks in range of vehicle based wireless router 196.

As previously described, system 100 may include a wireless transceiver, such as BLUETOOTH transceiver 152, modem 170, or router 196, for example, in communication with vehicle processor 106, which may be 106 further programmed to obtain information including a commanded destination to pick up a future passenger or a predetermined location or backup location 199 from a remote database of remote server 166 via network 158, for example.

Figure 2:
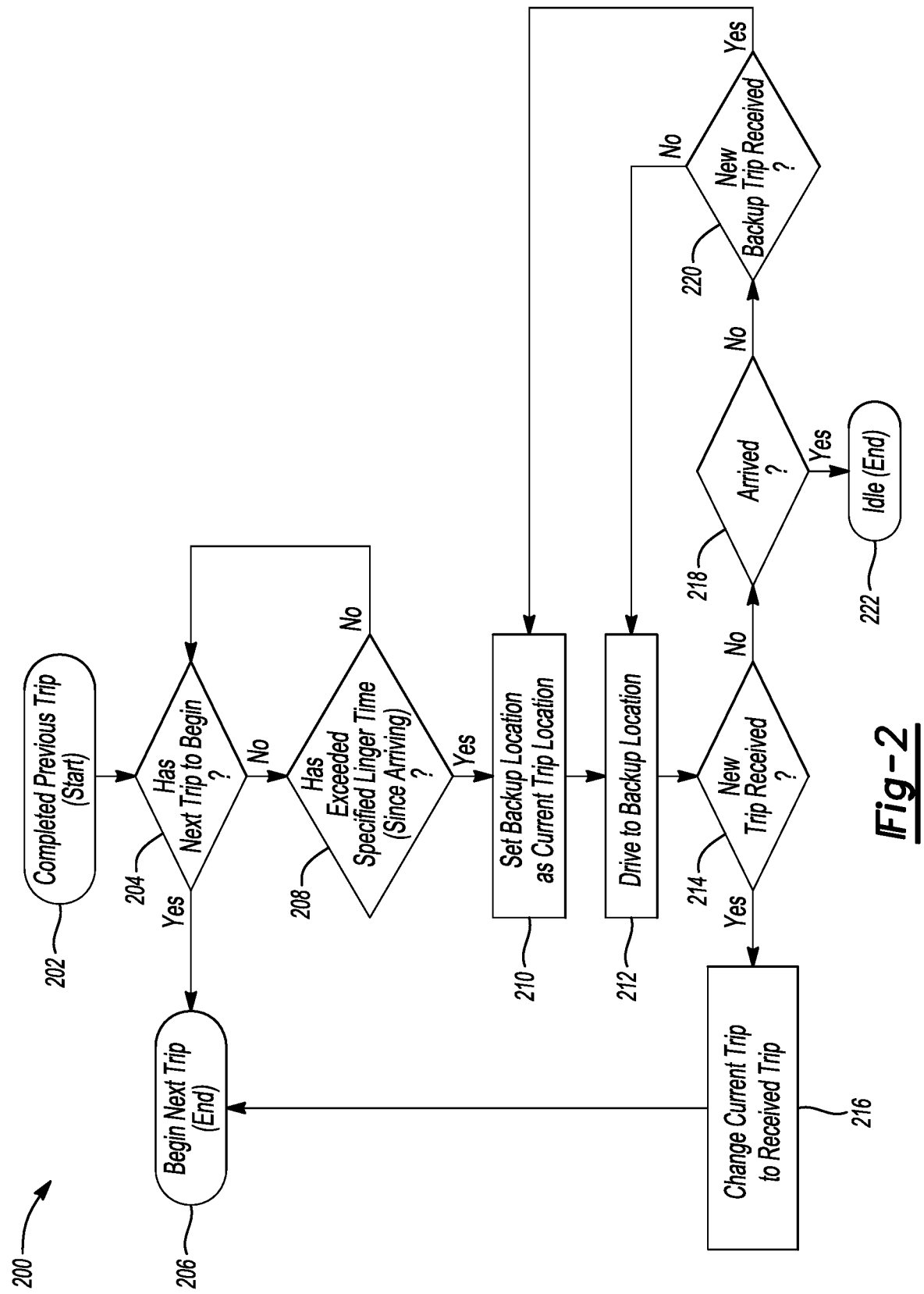
FIG. 2 is a flowchart illustrating operation of a system or method for vehicle ride-hailing according to various embodiments.

FIG. 2 is a flowchart illustrating operation of a system or method 202 for vehicle ride-hailing according to various embodiments. As previously described, various functions or processes illustrated may be performed in a different order, may be omitted, or may be repeatedly performed although not explicitly illustrated or described to accomplish various features and advantages described herein as those of ordinary skill in the art will understand. Operation of a system or method for ride-hailing with a back-up location 199 based on not receiving a command for a predetermined period or absence of ingress/egress of a passenger, for example.

Controlling or operating a vehicle 102 to travel to a back-up location 199 may include the vehicle 102 completing a previous trip or starting from a known a location as represented by 202. A passenger may summon or hail the vehicle 102 by connecting to a remote server to schedule a ride and start the next trip for the vehicle 102 as represented at 204. Summoning, scheduling or hailing the vehicle may also include a desired pick-up location and time, destination location, arrival time, type of vehicle, etc. Scheduling the vehicle may be completed by a dispatch or dispatcher remotely communicating with the vehicle 102. The remote server may compare the requested reservation parameters with available ride-sharing vehicles to determine matching vehicle preferences. The ride-sharing vehicle may end its next trip once it reaches the desired pick-up location or destination location and the passenger has either boarded or exited the vehicle as represented at 206.

The vehicle 102 may arrive at the specified pick-up location, in arrival mode, and linger or wait for a predetermined amount of time or period for the future passenger to board the vehicle 102. Alternatively, the vehicle 102 may arrive at the specified drop-off location, in departure mode, and linger or wait for a predetermined amount of time or period for the passenger to exit the vehicle, as represented at 208. As was previously mentioned, the linger or predetermined period may be pre-programmed or specified by an ad-hoc communication by a dispatcher. Moreover, the length of time may vary depending on if the vehicle is in arrival mode or departure mode.

If either of these wait or linger times exceed predetermined period, the processor may establish the predetermined location or backup location as represented at 210. Additionally, if the vehicle has insufficient wireless signal, the processor may be programmed to set the predetermined location or backup location. The vehicle 102 then travels a pre-programmed route or turn-by-turn navigation received remotely, from a dispatcher or otherwise, to the predetermined location, as represented at 212.

If the vehicle 102 receives a new trip while driving to the backup location, as represented at 214, the processor will change the current trip to the backup location or predetermined location 199 to the commanded destination of the new trip, as represented at 216. If the vehicle does not receive a new trip and has not arrived at the predetermined location or backup location 199, the processor branches based on receiving a new backup or predetermined location, as represented at 220. For example, if a spike in ride-hailing demand is detected a new predetermined location 199 may be specified. Alternatively, a dispatcher may specify a new backup or predetermined location 199. If the vehicle has arrived at the backup or predetermined location, the vehicle may idle and end the process, as represented at 222.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An autonomous vehicle control method comprising:
    while a vehicle is at a commanded destination and responsive to absence of an ingress/egress of a passenger for a predetermined period that is different depending on whether the vehicle is in arrival mode or departure mode, commanding the vehicle to travel to a predetermined location selected to have measures of cellular-wireless signal strength greater than a predetermined threshold; and
    autonomously operating the vehicle to travel to the predetermined location.

2. The method of claim 1 wherein the commanding is further responsive to absence of receiving instructions during the predetermined period.

3. The method of claim 2 wherein the commanding is further responsive to the vehicle losing a wireless connection.

4. The method of claim 1 wherein the predetermined period is longer when the vehicle is in arrival mode than when the vehicle is in departure mode.

5. The method of claim 1 wherein when the vehicle is in departure mode, the vehicle has arrived at the commanded destination so one or more passengers may exit the vehicle.

6. An autonomous vehicle comprising:
    a processor programmed to
        command the vehicle to travel to a predetermined location selected to have measures of wireless signal strength greater than a predetermined threshold responsive to expiration of a predetermined period, that is different depending on whether the vehicle is in arrival mode or departure mode, without passenger ingress/egress at a commanded destination, and
        autonomously operate the vehicle to travel to the predetermined location.

7. The autonomous vehicle of claim 6 wherein the processor is further programmed to command the vehicle to travel to the predetermined location responsive to absence of receiving instructions during the predetermined period.

8. The autonomous vehicle of claim 7 wherein the processor is further programmed to command the vehicle to travel to the predetermined location responsive to the vehicle losing a wireless connection.

9. The autonomous vehicle of claim 6 wherein the predetermined location is further selected to have measures of future ride-hailing demand exceeding a threshold.

10. The autonomous vehicle of claim 6 wherein the predetermined period is longer when the vehicle is in arrival mode than when the vehicle is in departure mode.

11. The autonomous vehicle of claim 6 wherein when the vehicle is in arrival mode the vehicle has arrived at the commanded destination so one or more passengers may enter the vehicle.

12. The autonomous vehicle of claim 6 wherein operating the vehicle to travel to the predetermined location includes executing a series of autonomous maneuvers.

13. The autonomous vehicle of claim 11 wherein the processor is further programmed to select the predetermined location based on the commanded destination.

14. A method of controlling an autonomous vehicle comprising:
    responsive to absence of receiving a command to travel to a future destination while the vehicle is at a commanded destination and to absence of an ingress/egress of a passenger for a predetermined period that is different depending on whether the vehicle is in arrival mode or departure mode, commanding the vehicle to travel to a predetermined location selected to have measures of wireless signal strength greater than a predetermined threshold; and
    autonomously operating the vehicle to travel to the predetermined location.

15. The method of claim 14 wherein the predetermined period is based on measures of wireless signal strength at the commanded destination.

16. The method of claim 14 wherein the predetermined period is based on measures of permissible loitering at the commanded destination.

17. The method of claim 14 wherein the predetermined location is selected to have measures of cellular-wireless signal strength greater than a predetermined threshold.

* * * * *